(12) United States Patent
Shah

(10) Patent No.: US 6,838,859 B2
(45) Date of Patent: Jan. 4, 2005

(54) DEVICE FOR INCREASING POWER OF EXTREMELY LOW DC VOLTAGE

(76) Inventor: Reza H. Shah, 21 Park Ave., Acton, Ontario (CA), L7J 1Y3

(*) Notice: Subject to any disclaimer, the term of this patent is extended or adjusted under 35 U.S.C. 154(b) by 350 days.

(21) Appl. No.: 10/216,733

(22) Filed: Aug. 13, 2002

(65) Prior Publication Data

US 2004/0033456 A1 Feb. 19, 2004

(51) Int. Cl.[7] .................................................. H02P 9/04
(52) U.S. Cl. ........................................................ 322/38
(58) Field of Search ............................ 322/38; 363/52, 363/53, 86, 126, 22, 23, 133, 24, 16, 132; 307/103, 113, 98, 99, 115

(56) References Cited

U.S. PATENT DOCUMENTS

| | | | | | |
|---|---|---|---|---|---|
| 3,377,540 A | * | 4/1968 | Meyer | ....................... | 363/56.07 |
| 3,894,280 A | * | 7/1975 | Bishop et al. | ................. | 363/25 |
| 3,996,506 A | * | 12/1976 | Kichak | ......................... | 363/49 |
| 4,937,470 A | * | 6/1990 | Zeiler | .......................... | 327/109 |
| 4,973,896 A | * | 11/1990 | Shiga et al. | ................... | 322/28 |
| 5,132,888 A | * | 7/1992 | Lo et al. | ........................ | 363/17 |
| 5,598,325 A | * | 1/1997 | Pleitz | ........................... | 363/24 |
| 6,072,701 A | * | 6/2000 | Sato et al. | ..................... | 363/17 |
| 2002/0181253 A1 | * | 12/2002 | Watanabe | ................ | 363/21.01 |
| 2004/0095114 A1 | * | 5/2004 | Kernahan | .................... | 323/282 |

* cited by examiner

*Primary Examiner*—Joe Waks
*Assistant Examiner*—Julio Gonzalez
(74) *Attorney, Agent, or Firm*—David W. Wong

(57) ABSTRACT

A device for increasing an extreme low voltage from a heat to electrical voltage thermopile is shown. The device has an oscillator including two MOSFET transistors coupled to a transformer having four bifilar windings wound on a core having a high permeability. The two transistors operate alternately to generate an intermediate voltage which is increased in magnitude by a voltage doubling and rectifying circuit to obtain the substantially constant operating output voltage. The output voltage is further maintain constant by a current control cirucit including an adjustable potentiometer adjustable to vary the current.

7 Claims, 1 Drawing Sheet

DEVICE FOR INCREASING POWER OF EXTREMELY LOW DC VOLTAGE

FIELD OF THE INVENTION

This invention relates to an electronic device for increasing an extremely low DC voltage to a voltage suitable for operating other electronic devices. More particularly it relates to an electronic device usable for increasing the extremely low voltage generated by a transducer which converts heat energy of the flame of a pilot light of a gas equipment such as a gas fireplace and the like to an electrical power suitable for operating the electrical control of the gas supply to the gas equipment.

BACKGROUND OF THE INVENTION

The gas supply to the main burner of a gas equipment is controlled by an electrically operated solenoid valve. Such valve is commonly operated with a voltage supply of 6 to 9 volts DC in order to reduce the potential fire hazard for operating it in the explosive gas environment if it is operated with a higher voltage. The solenoid valve may be actuated with a manual switch or an electronic remote control device. The operating electrical power of the electronic remote control device, also is commonly in the range of 6 to 9 volts supplied by either a battery or by power obtained through a step-down voltage supply from an AC current source. Wiring of an AC source to the receiver of the remote control device is often difficult to make due to the installation location of the gas equipment particularly when the gas equipment is situated in a building having a finished wall construction. Battery may be used to provide the electrical power for operating the remote control receiver for ease in installation. However, the drawback of a battery supply is that the battery requires replacement from time to time as its power depletes, especially when its power would deplete in a much faster rate in a hot environment during the operation of the gas equipment. Moreover, users of the gas equipment are unwilling to perform such task of replacing the battery due to either the fear of might accidentally cause a fire hazard in the explosive gas environment or being unfamiliar with the gas equipment. More often the user would neglect to replace the battery so that the gas equipment becomes inherently inoperative.

SUMMARY OF THE INVENTION

It is the principal object of the present invention to provide an electronic device operable for increasing extremely low DC voltage to a voltage suitable for operating electronic devices.

It is an object of the present invention to provide a power source for operating the remote control switch of the solenoid valve a gas equipment by utilizing the heat energy of its pilot light.

It is another object of the present invention to provide a conversion device which is capable of converting heat energy of the pilot light burner of a gas equipment to electrical power in the magnitude suitable for operating electronic control devices of the gas equipment.

It is another object of the present invention to provide an electronic device for converting heat energy to a substantially constant electrical power source for operating the gas supply control solenoid valve of a gas equipment.

It is yet another object of the present invention to provide a heat to electrical power supply conversion device which is simple in construction and easy to incorporate in a natural gas equipment installation.

These and other objects are achieved by my invention. The structure and some of its' various modes of operation may be understood by reference to the drawings taken in conjunction with the detailed description.

DETAILED DESCRIPTION OF THE PREFERRED EMBODIMENTS

Figure 1:
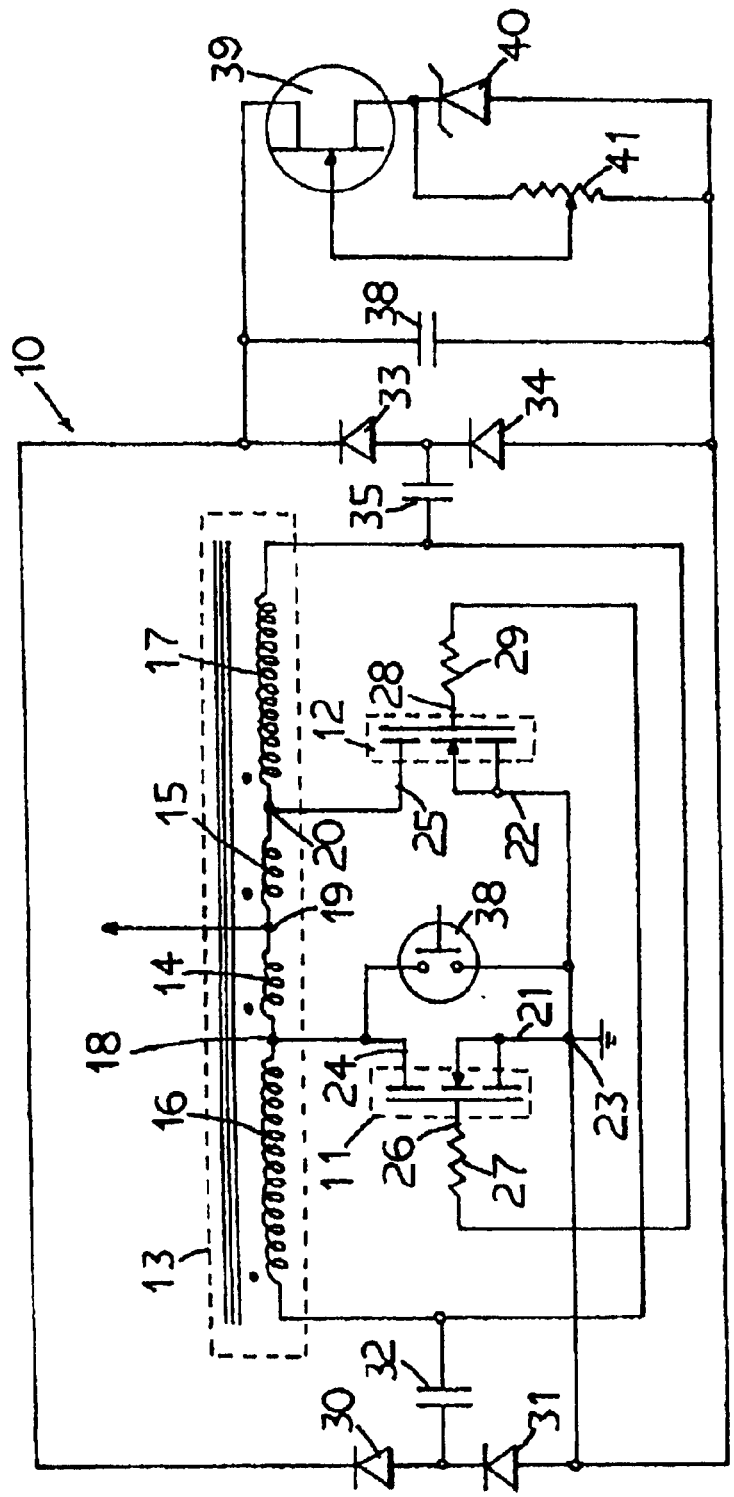
FIG. 1 is a schematic circuit diagram of the electrical circuit of the device according to the present invention.

With reference to the drawing, the electronic device 10 of the present invention has an oscillation circuit having two MOSFET transistors 11 and 12 connected in tandem and coupled with a multi-winding transformer 13 which has four bifilar windings 14, 15, 16 and 17. The four bifilar windings are wound on a core having a very high permeability so as to provide a good coupling between the windings. The numbers of windings in windings 14 and 15 are equal to one another and the numbers of windings of windings 16 and 17 are equal to one another and is much higher than those of windings 14 and 15. The start of the winding 14 is connected to the end of the winding 16 at a first connection terminal 18, and the end of the winding 14 is connected to the start of the winding 15 at a second connection terminal 19, whereas the end of the winding 15 is connected to the start of the winding 17 at a third connection terminal 20. The start of the windings 14, 15, 16 and 17 is indicated in the drawing with a dot. The source terminals 18 and 19 for the transistors 11 and 12 respectively are connected to one another. The source terminals 21 and 22 of the transistors 11 and 12 respectively are connected to a common terminal 23. The drain terminal 24 of the transistor 11 is connected to the first connection terminal 18 and the drain terminal 25 of transistor 12 is connected to the connection terminal 20. The gate terminal 26 of the transistor 11 is connected to the end of winding 17 through a resistor 27 while the gate terminal 28 is connected to the start of the winding 16 through a resistor 29 similar to resistor 27. The head of transformer winding 16 is connected to the anode of a first Schottky diode 30 and the cathode of a second Schottky diode 31 through a capacitor 32. Similarly, the end of transformer winding 17 is connected to the anode of a third Schottky diode 33 and the cathode of a four Schottky diode 34 through a capacitor 35. The parallel diode circuit provides a full wave rectification to the voltage outputted from the oscillation circuit.

The above oscillation circuit is operable by an extremely low DC voltage as low as about 0.15 volt which is too low to operate common transistors. The extremely low voltage is inputted to connection terminal 19 and common terminal 23. Due to the extremely low voltage, the oscillator circuit initially would not be actuated by the low voltage; in order to initiate the operation of the oscillation circuit, a short circuit operation is made by a momentary switch 38 connected across the source terminal 21 and drain terminal 24 of the transistor 11. When the momentary switch 38 is closed and then opened, the output first voltage across the drain to common terminals of the transistor 11 will be at least double of that of the extremely low input DC voltage; and this first voltage will induce a much higher first secondary voltage across the winding 16 by the transformer action due to the much higher number of windings of winding 16 relative to the winding 14. This first secondary voltage will be applied to the gate terminal 28 through resistor 29 to present an increased voltage to turn on the transistor 12 so that the transistor 12 begins to conduct. The conduction of current through the transistor 12 will continue until the current saturates the core of the transformer 13 at which point the transistor 12 will turn off. The termination of conduction of the transistor 12 will generate a second secondary voltage across the winding 17 by the transformer action due the much higher number of windings of the winding 17 relative to the winding 15. The second secondary voltage will be applied inherently to the transistor 11 to turn the later on. In this manner, the transistors 11 and 12 are turned on and off with one transistor turning on while the other transistor turning off, in a continuous cycle. The combination of diodes 30 and 31 and capacitor 32 forms a first doubling circuit to provide a voltage doubling function to the first secondary voltage across the winding 13, while the combination of diodes 33 and 34 and capacitor 35 provides a second voltage doubling circuit to provide a voltage doubling function to the second secondary voltage across the winding 17. The two doubling circuits also provide a full wave rectification to the combined first secondary voltage and second secondary voltage appearing at terminals 26 and 37. This combined high voltage is further smoothed by the capacitor 38 connected across the terminals 26 and 37. The high voltage has sufficient current and a high efficiency. It is also very economical to build as it does not require a special winding for the high voltage output. The feedback windings 16 and 17 are used in the dual purposes to provide a full load current.

The smooth output voltage across the terminals 26 and 37 to a stabilization circuit including FET transistor 39 and a zener diode 40 connected in series across the output terminals. A potentiometer 41 is connected between the gate of transistor 39 and the anode of the zener diode 40. The potentiometer 41 may be adjusted to vary the amount of current flowing through the drain terminal to the source terminal of the FET transistor 39 into the zener diode 40 while the output voltage is maintained substantially constant.

It would be appreciated by those skilled in the art that alternatively P-channel MOSFET transistor may be used instead of the N-channel MOSFET transistor by changing the polarity and connection of the diodes and the junction FET transistor.

The above circuit device is suitable for increasing the extra low DC voltage obtained from a thermopile heated by the pilot light flame of a gas equipment. Such extra low DC voltage is not suitable for operating the electrical control of the gas supply to the main burner of a gas equipment. With the device of the present invention, the extra low voltage is increased to the suitable voltage for operating the gas control solenoid valve and the remote control circuit of the gas supply to the main burner.

While the preferred embodiment of the invention has been disclosed, it should be appreciated that the invention is susceptible of modification without departing from the scope of the following claims.

What I claim is:

1. A device for increasing an extremely low DC voltage to an operating voltage suitable for operating electrical control of gas supply valve for gas equipment, comprising a first transistor and a second transistor each having a gate terminal, source terminal, and drain terminal, a transformer having a first winding, a second winding, a third winding, and a fourth winding, said first winding and said second winding having equal number of windings, and said third winding and fourth winding having equal number of windings substantially higher than the number of windings of said first winding and second winding, said first winding having a start end connected to a rear end of said third winding and to a first connection terminal, said first winding having a rear end connected to a start end of said second winding and to a second connection terminal, said second winding having a rear end connected to a start end of said fourth winding and to a third connection terminal, said source terminal of said first transistor and said second transistor being connected to one another, said source terminal of said first transistor and second transistor being connected to a common terminal, said drain terminal of said first transistor being connected to said first connection terminal, said drain terminal of said second transistor being connected to said third connection terminal, said gate terminal of said first transistor being connected to a rear end of said fourth winding through a first resistor, said gate terminal of said second transistor being connected to a start end of said third winding through a second resistor, said third winding having a start end connected to an anode of a first diode and a cathode of a second diode through a first capacitor, said fourth winding having a rear end connected to an anode of a third diode and a cathode of a fourth diode through a second capacitor, said cathode of said first diode being connected to said cathode of said third diode and to a first output terminal, and said anode of said second diode being connected to said anode of said fourth diode and to a second output terminal, said second connection terminal and said common terminal being operative to receive said extremely low voltage to said device, and said a momentary switch connected between said source terminal and said drain terminal of said first transistor and operative for initiating operation of said device to provide said operating voltage from said first output terminal and said second output terminal.

2. A device according to claim 1 wherein said first transistor and said second transistor are MOSFET transistors and said first diode, second diode, third diode, and fourth diode are Schottky diodes.

3. A device according to claim 2 wherein said first winding, second winding, third winding, and fourth winding are bifilar windings wound on a core having a high permeability.

4. A device according to claim 3 including a third capacitor connected between said first output terminal and said second output terminal adapted for reducing spurious voltages in said operating voltage.

5. A device according to claim 4 including a current control circuit connected between said first output terminal and said second output terminal, said current control circuit including a third transistor having a source terminal, a collector terminal, and a gate terminal, said source terminal of said third transistor being connected to a cathode terminal of a fifth diode and said fifth diode having an anode connected to said second output terminal, said collector terminal of said third transistor being connected to said first output terminal, a potentiometer having one terminal connected to said cathode terminal of said fifth diode and a second terminal connected to said anode terminal of said fifth diode, and an adjustable arm connected to said gate terminal of said third transistor, said adjustable arm being operative for adjusting the magnitude of voltage at said gate of said third transistor to maintain said operating voltage constant.

6. A device according to claim 5 wherein said third transistor is a junction FET transistor, and said fifth diode is a zener diode.

7. A device according to claim 6 wherein said extreme low DC voltage is obtained from a thermopile located at a pilot light flame of said gas equipment.

* * * * *